US009129629B1

(12) United States Patent
Yoshida (10) Patent No.: US 9,129,629 B1
(45) Date of Patent: Sep. 8, 2015

(54) CLOCK ACCURACY DETERMINING METHOD AND CLOCK ACCURACY DETERMINING DEVICE

(71) Applicant: Kabushiki Kaisha Toshiba, Minato-ku, Tokyo (JP)

(72) Inventor: Yutaka Yoshida, Yokohama (JP)

(73) Assignee: Kabushiki Kaisha Toshiba, Minato-ku, Tokyo (JP)

( * ) Notice: Subject to any disclaimer, the term of this patent is extended or adjusted under 35 U.S.C. 154(b) by 0 days.

(21) Appl. No.: 14/280,083

(22) Filed: May 16, 2014

Related U.S. Application Data (60) Provisional application No. 61/944,400, filed on Feb. 25, 2014.

(51) Int. Cl.
*G11B 5/09* (2006.01)
*G11B 5/596* (2006.01)

(52) U.S. Cl.
CPC .................................. *G11B 5/59616* (2013.01)

(58) Field of Classification Search
None
See application file for complete search history.

(56) References Cited

U.S. PATENT DOCUMENTS

| 6,943,978 | B1 * | 9/2005 | Lee .................................. 360/75 |
| 7,199,959 | B1 * | 4/2007 | Bryant ............................ 360/51 |
| 7,486,467 | B2 * | 2/2009 | Sai et al. .......................... 360/75 |
| 7,646,559 | B1 * | 1/2010 | Cheung et al. .................. 360/75 |
| 8,000,049 | B2 * | 8/2011 | Vanlaanen et al. .............. 360/51 |
| 8,023,216 | B1 * | 9/2011 | Cheung et al. .................. 360/51 |
| 8,059,360 | B1   | 11/2011 | Melkote et al. |
| 2007/0070538 | A1 * | 3/2007 | Lau et al. ......................... 360/55 |
| 2007/0115578 | A1 * | 5/2007 | Winarski et al. ................ 360/48 |
| 2008/0137226 | A1   | 6/2008 | Ueda et al. |

FOREIGN PATENT DOCUMENTS

JP       2001-332045 A    11/2001

* cited by examiner

*Primary Examiner* — Peter Vincent Agustin
(74) *Attorney, Agent, or Firm* — White & Case LLP (57) ABSTRACT

According to one embodiment, when a timing error between a signal read back from a multi-spiral pattern pre-recorded on a magnetic disc and an SSW clock generated at a read/write channel is set as an SSW clock following error, SSW clock accuracy is determined based on results of comparison between SSW clock following errors read from two different points in each of spiral patterns constituting the multi-spiral pattern.

20 Claims, 10 Drawing Sheets

CLOCK ACCURACY DETERMINING METHOD AND CLOCK ACCURACY DETERMINING DEVICE

CROSS-REFERENCE TO RELATED APPLICATIONS

This application is based upon and claims the benefit of priority from Provisional Patent Application No. 61/944,400, filed on Feb. 25, 2014; the entire contents of which are incorporated herein by reference.

FIELD

Embodiments described herein relate generally to a clock accuracy determining method and a clock accuracy determining device.

BACKGROUND

There are magnetic disc devices in which self servo write (SSW) is executed to record a servo pattern into a magnetic disc. At the SSW, a servo pattern is recorded with reference to a multi-spiral pattern recorded on the magnetic disc prior to product shipment.

DETAILED DESCRIPTION

In general, according to one embodiment, when a timing error between a signal read back from a multi-spiral pattern pre-recorded on a magnetic disc and an SSW clock generated at a read/write channel is set as an SSW clock following error, SSW clock accuracy is determined based on results of comparison between SSW clock following errors read from two different points in each of spiral patterns constituting the multi-spiral pattern.

Exemplary embodiments of a clock accuracy determining method and a clock accuracy determining device will be explained below in detail with reference to the accompanying drawings. The present invention is not limited to the following embodiments.

First Embodiment

Figure 1:
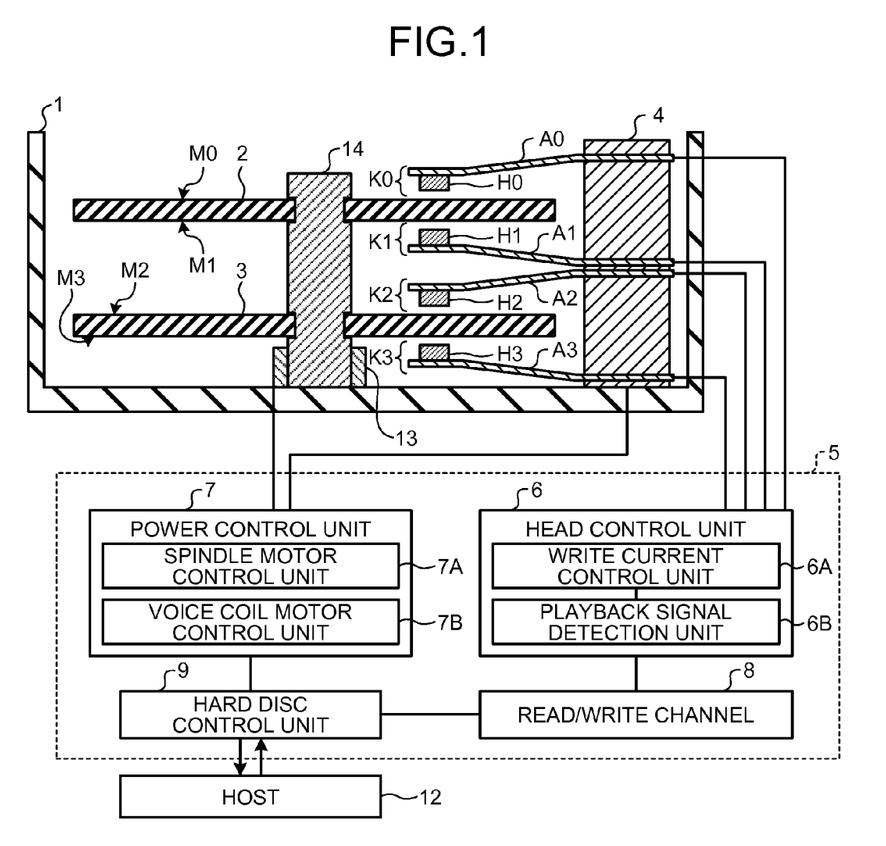
FIG. 1 is a schematic block diagram of a magnetic disc device to which a clock accuracy determining method according to a first embodiment is applied.

FIG. 1 is a schematic block diagram of a magnetic disc device to which a clock accuracy determining method according to a first embodiment is applied.

In FIG. 1, the magnetic disc device includes magnetic discs 2 and 3. The magnetic disc 2 has disc surfaces M0 and M1 on each side, and the magnetic disc 3 has disc surfaces M2 and M3 on each side. The magnetic discs 2 and 3 are integrally supported via a spindle 14. In addition, the magnetic disc device includes carriages K0 to K3 with respect to the disc surfaces M0 to M3, respectively. The carriages K0 to K3 include magnetic heads H0 to H3 and arms A0 to A3, respectively. The magnetic heads H0 to H3 are held with respect to the disc surfaces M0 to M3 via the arms A0 to A3 so as to be opposed to the disc surfaces M0 to M3, respectively. The arms A0 to A3 are capable of sliding the magnetic heads H0 to H3 in horizontal planes, respectively.

The magnetic disc device also includes a voice coil motor 4 driving the carriages K0 to K3 and a spindle motor 13 rotating the magnetic discs 2 and 3 via the spindle 14. The magnetic discs 2 and 3, the carriages K0 to K3, the voice coil motor 4, the spindle motor 13, and the spindle 14 are stored in a case 1.

The magnetic disc device also includes a magnetic recording control unit 5. The magnetic recording control unit 5 includes a head control unit 6, a power control unit 7, a read/write channel 8, and a hard disc control unit 9. The head control unit 6 includes a write current control unit 6A and a playback signal detection unit 6B. The power control unit 7 includes a spindle motor control unit 7A and a voice coil motor control unit 7B.

The head control unit 6 processes signals at recording and playback. The write current control unit 6A controls write currents flowing in the magnetic heads H0 to H3. The playback signal detection unit 6B detects signals read at the magnetic heads H0 to H3. The power control unit 7 drives the voice coil motor 4 and the spindle motor 13. The spindle motor control unit 7A controls rotation of the spindle motor 13. The voice coil motor control unit 7B controls driving of the voice coil motor 4. The read/write channel 8 converts signals read back at the magnetic heads H0 to H3 to a data format capable of being handled at a host 12, or converts data output from the host 12 to a signal format capable of being recorded at the magnetic heads H0 to H3. The foregoing format conversions include DA conversion and encoding. The read/write channel 8 also decodes signals read back at the magnetic heads H0 to H3 or subjects data output from the host 12 to code modulation. The hard disc control unit 9 performs recording/playback control under instructions from the host 12 or exchanges data between the host 12 and the read/write channel 8. The hard disc control unit 9 may be provided with a general-purpose processor for recording/playback control and a dedicated processor for exchanging data between the host 12 and the read/write channel 8.

The magnetic recording control unit 5 is connected to the host 12. The host 12 may be a personal computer issuing a write instruction or a read instruction to the magnetic disc device or may be an external interface.

Posterior to product shipment of the magnetic disc, signals are read from the disc surfaces M0 to M3 via the magnetic heads H0 to H3 while the magnetic discs 2 and 3 are rotated by the spindle motor 13, and are detected by the playback signal detection unit 6B. The signals detected by the playback signal detection unit 6B are data-converted at the read/write channel 8, and then sent to the hard disc control unit 9. Then, at the hard disc control unit 9, the current positions of the magnetic heads H0 to H3 are calculated based on sector/cylinder information and burst signals contained in servo data extracted from the signals detected at the playback signal detection unit 6B, and positioning control is performed on the magnetic heads H0 to H3 to bring the same closer to target positions.

The servo data can be recorded by SSW on the disc surfaces M0 to M3 prior to shipment of the magnetic disc as a product. On execution of the SSW, the multi-spiral patterns recorded on the disc surfaces M0 to M3 are referred to prior to recording of the servo data.

Figure 2A:
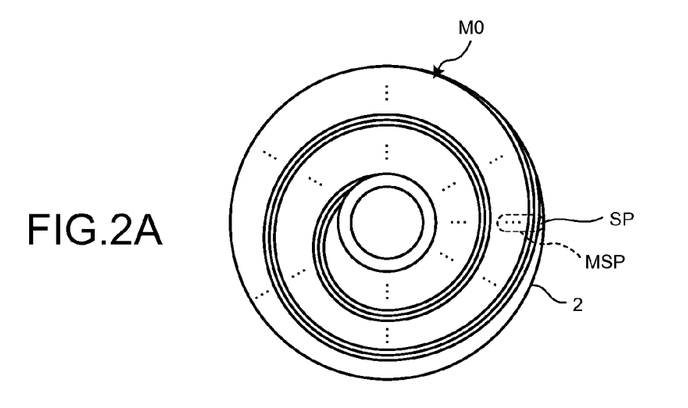
FIG. 2A is a plane view of an arrangement of a multi-spiral pattern on the magnetic disc illustrated in FIG. 1.
Figure 2B:
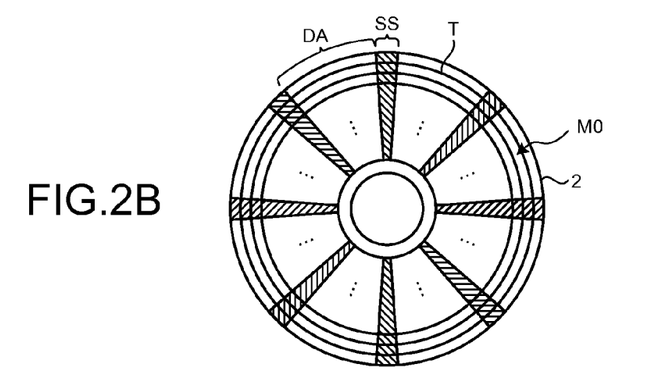
FIG. 2B is a plane view of a track arrangement in a final pattern subjected to SSW on the magnetic disc illustrated in FIG. 1.
Figure 2C:
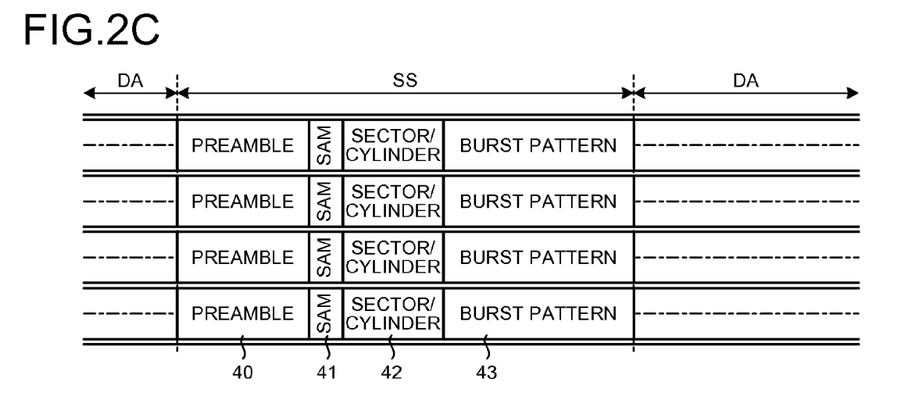
FIG. 2C is a diagram illustrating a configuration example of servo areas illustrated in FIG. 2B.

FIG. 2A is a plane view of an arrangement of a multi-spiral pattern on the magnetic disc illustrated in FIG. 1, FIG. 2B is a plane view of a track arrangement in a final pattern on the magnetic disc illustrated in FIG. 1, and FIG. 2C is a diagram illustrating a configuration example of servo areas illustrated in FIG. 2B.

Referring to FIG. 2A, multi-spiral patterns MSP are recorded on the disc surface M0 of the magnetic disc 2 before SSW illustrated in FIG. 1, for example. The multi-spiral pattern MSP is provided with N (N is an integer of 2 or more) spiral patterns SP.

Referring to FIG. 2B, tracks T are provided along a circumferential direction on the disc surface M0 after SSW, for example. Each of the tracks T includes a data area DA into which user data is to be written and a servo area SS in which servo data is written. The servo areas SS are radially arranged, and the data areas DA are arranged between the servo areas SS on each of the tracks T.

In the servo area SS, a preamble 40, a servo area mark 41, sector/cylinder information 42, and a burst pattern 43 are written, as illustrated in FIG. 2C. The sector/cylinder information 42 can give servo addresses in the circumferential direction and the radial direction of the disc surface M0, and can be used for seek control to move the magnetic head H0 to a target track. The burst pattern 43 can be used for tracking control to position the magnetic head H0 within the range of the target track. The burst pattern 43 may be a null-type pattern, an area-type pattern, or a phase difference-type pattern. Incidentally, the disc surfaces M1 to M3 also can be configured in the same manner as the disc surface M0.

Figure 3:
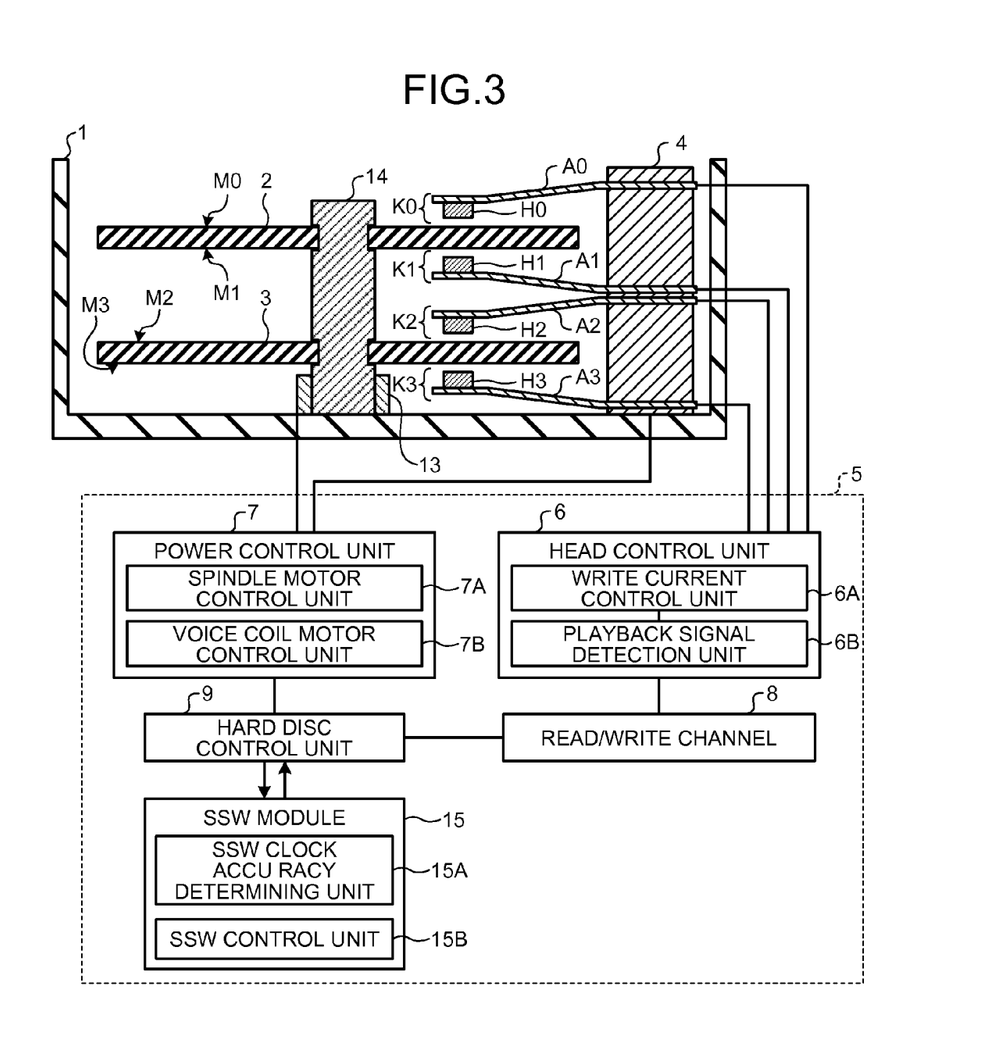
FIG. 3 is a schematic block diagram of the magnetic disc device according to the first embodiment under clock accuracy determination.

FIG. 3 is a schematic block diagram of the magnetic disc device according to the first embodiment under clock accuracy determination.

Referring to FIG. 3, SSW is executed at an SSW module 15 in the magnetic disc device. At that time, the multi-spiral pattern MSP illustrated in FIG. 2A is recorded on the disc surface M0. The SSW module 15 is provided with an SSW clock accuracy determining unit 15A and an SSW control unit 15B. The SSW clock accuracy determining unit 15A is capable of conducting determination of SSW clock accuracy based on results of comparison between SSW clock following errors read from two different points in the spiral pattern SP. The SSW clock following error is a timing error between a signal sent from the playback signal detection unit 6B and an SSW clock generated at the read/write channel 8. The SSW control unit 15B is capable of instructing the magnetic disc device to execute the SSW based on results of the determination of SSW clock accuracy.

Then, while the magnetic discs 2 and 3 are rotated by the spindle motor 13, signals are read from the multi-spiral patterns MSP on the disc surfaces M0 to M3 via the magnetic heads H0 to H3, and are detected by the playback signal detection unit 6B. When the multi-spiral patterns MSP are recorded on any one of the disc surfaces M0 to M3, signals are read from the multi-spiral patterns MSP on that surface. The signals detected by the playback signal detection unit 6B are subjected to data conversion at the read/write channel 8, and are sent to the SSW clock accuracy determining unit 15A via the hard disc control unit 9. Then, at the SSW clock accuracy determining unit 15A, timing errors between the signals sent from the playback signal detection unit 6B and SSW clocks generated at the read/write channel 8 are calculated as SSW clock following errors. Here, at two different disc radial positions, a differential value between the SSW clock following errors calculated from the multi-spiral patterns MSP is calculated. Then, when the differential value exceeds a threshold value, it is determined that the SSW clock accuracy is erroneous. Meanwhile, when the differential value is equal to or less than the threshold value, the SSW control unit 15B instructs the magnetic disc device to execute SSW. Then, when the SSW is executed at the magnetic disc device, the servo data illustrated in FIG. 2B is recorded on the disc surfaces M0 to M3.

Here, by calculating the differential value between the SSW clock following errors at the two different disc radial positions and conducting the determination of SSW clock accuracy, even when the SSW clock following error increases in a specific spiral pattern SP, it is possible to prevent that error determination is made for insufficient SSW clock accuracy. At that time, even when the SSW clock following error increases in a specific spiral pattern SP, the timing for writing servo data illustrated in FIG. 2B shifts relatively at all of the radial positions, but there is no increase in clock jitter and thus the SSW can be normally performed. Accordingly, it is possible to prevent that the magnetic disc device capable of performing normal SSW is treated as a failed product for insufficient SSW clock accuracy, which results in improvement of production yield.

Figure 4A:
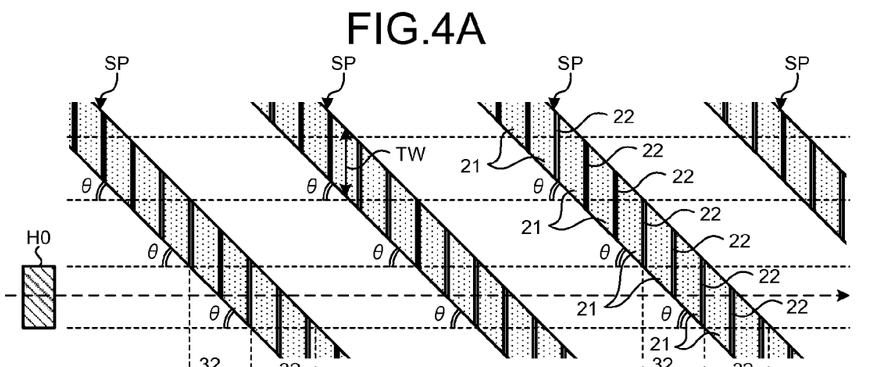
FIG. 4A is a schematic view of a spiral pattern with respect to a time axis.
Figure 4B:
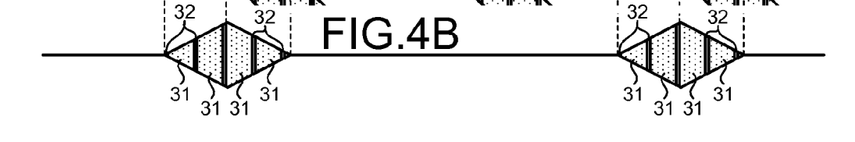
FIG. 4B is a diagram illustrating a waveform of a playback signal of the multi-spiral pattern illustrated in FIG. 2A.

FIG. 4A is a schematic view of a spiral with respect to a time axis, and FIG. 4B is a diagram illustrating a waveform of a playback signal in the multi-spiral pattern illustrated in FIG. 2A.

Referring to FIG. 4, N poles and S poles are alternately arranged in each of the spiral patterns SP on the disc surface M0 in the circumferential direction to form a radio-frequency area 21. In addition, synchronization marks 22 are provided in each of the spiral patterns SP at predetermined circumferential intervals. The spiral patterns SP are inclined at an inclination angle θ with respect to the movement direction of the magnetic head H0.

In addition, when the magnetic head H0 obliquely passes over the multi-spiral pattern MSP, the waveform of a playback signal 31 in the radio-frequency area 21 of each of the spiral patterns SP has a small amplitude on both ends thereof. At that time, gaps 32 are formed in the playback signal 31 of each of the spiral patterns SP according to the synchronization marks 22. The SSW clock accuracy determining unit 15A is capable of calculating SSW clock following errors from the playback signal (gaps 32) at the synchronization marks 22.

Figure 5:
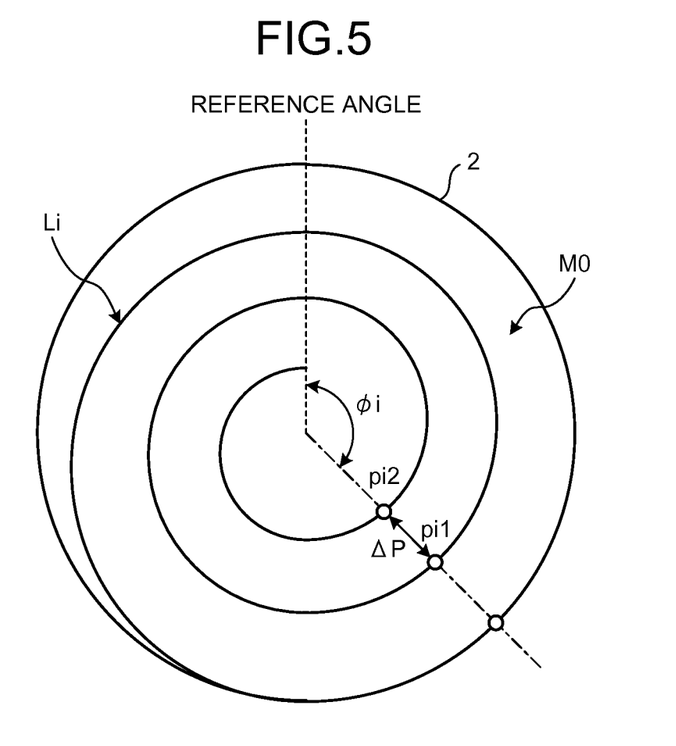
FIG. 5 is a plane view illustrating a method for setting two points equal to each other in angle from a reference angle of the spiral pattern illustrated in FIG. 2A.

FIG. 5 is a planar diagram illustrating a method for setting two points equal to each other in angle from a reference angle of the spiral pattern illustrated in FIG. 2A.

Referring to FIG. 5, two points pi1 and pi2 on an i-th (i≤N) spiral pattern Li are equal in angle φi from a reference angle. The two points pi1 and pi2 are separate from each other by a track interval ΔP. The track interval ΔP is a track conversion value that is equivalent to a radial displacement of one lap in the spiral pattern Li.

Figure 6:
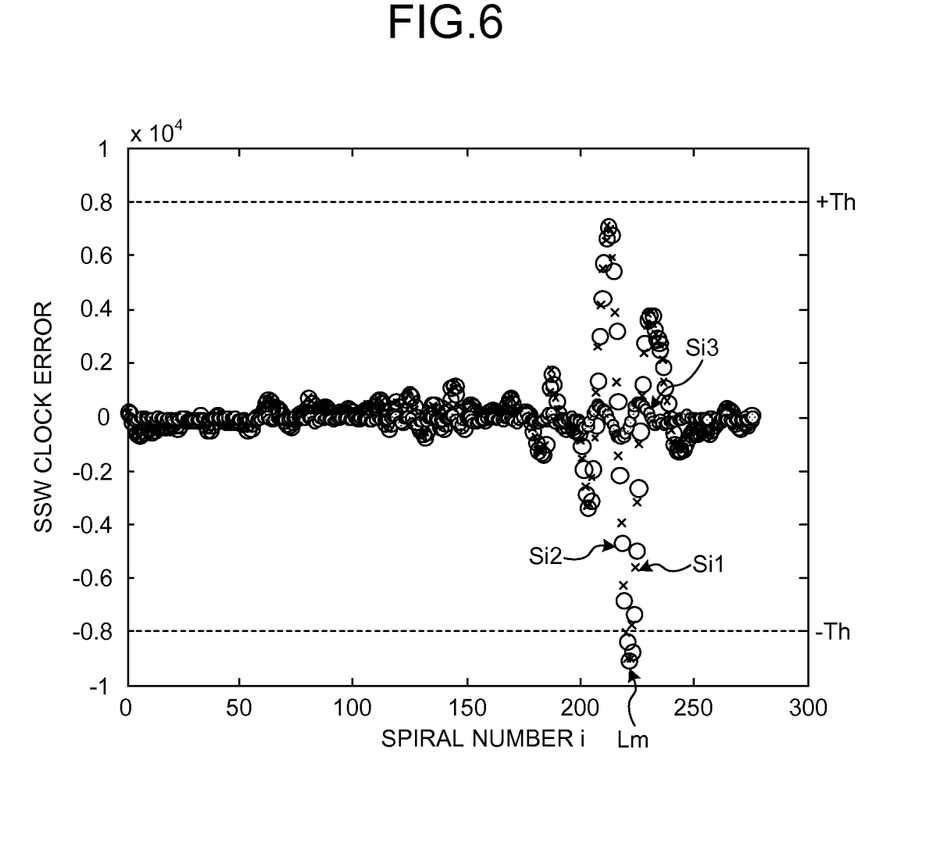
FIG. 6 is a diagram illustrating a relationship between spiral numbers and SSW clock following errors.

FIG. 6 is a diagram illustrating a relationship between spiral numbers i and SSW clock following errors. In the example of FIG. 6, the number of spirals N is set to 276, Si1 (i=1 . . . N) denotes SSW clock following error that is equivalent to one concentric track at the point pi1 in the i-th spiral pattern Li, Si2 denotes SSW clock following error that is equivalent to one concentric track at the point pi2 (i=1 . . . N) in the i-th spiral pattern Li, and Th denotes a threshold value for use in error determination on SSW clock following error.

As illustrated in FIG. 6, the spiral patterns Li have increased SSW clock following errors Si1 and Si2 in the vicinity of a specific i=m-th (m is a positive integer less than N) spiral pattern Lm as compared to other spiral patterns. When the SSW clock following errors Si1 and Si2 fall outside the range of the threshold value Th, it is determined that the SSW clock accuracy is erroneous.

Meanwhile, the spiral patterns Li in the vicinity of an m-th spiral pattern Lm have equal increase and decrease tendencies of the SSW clock following errors Si1 and Si2. Thus, when a difference Si3 between the SSW clock following errors Si1 and Si2 is determined, the SSW clock following errors Si1 and Si2 get balanced out in the spiral patterns Li in the vicinity of the m-th spiral pattern Lm so as to fall within the range of the threshold value Th. This prevents that the SSW clock accuracy is determined as erroneous.

SSW clock following errors Sm1 and Sm2 sharply increase at two points pm1 and pm2 in the m-th spiral pattern Lm and the increase tendency becomes equal between the two points pm1 and pm2 because there occurs variations in slit interval at an encoder when the multi-spiral patterns MSP is written into the disc surface M0 by an STW device, or the like. At that time, since the timing for writing the servo data illustrated in FIG. 2B relatively shifts at all of radial positions at angle φm from the reference angle, there is no shift in writing timing between adjacent tracks. It is thus possible to normally read the servo data subjected to SSW.

Specifically, for evaluation of the clock accuracy at the point pi1 in the spiral patterns Li (i=1 . . . N), the difference Si3 between the SSW clock following error Si1 at the point pi1 and the SSW clock following error Si2 at the point pi2 is determined by the following equation:

$$Si3 = Si1 - Si2 (i=1 \ldots N)$$

Then, when |Si3|≤Th for all of the spiral numbers i, it is determined that the SSW clock accuracy is normal, and when |Si3|>Th for any one of the spiral patterns Li, it is determined that the SSW clock accuracy is abnormal. In the difference Si3, since the in-phase component depending on the angle (pi included in the SSW clock following errors Si1 and Si2 is canceled, -Th<Si3<Th (i=1 . . . N) and it is thus determined that the clock accuracy is normal.

Second Embodiment

Figure 7:
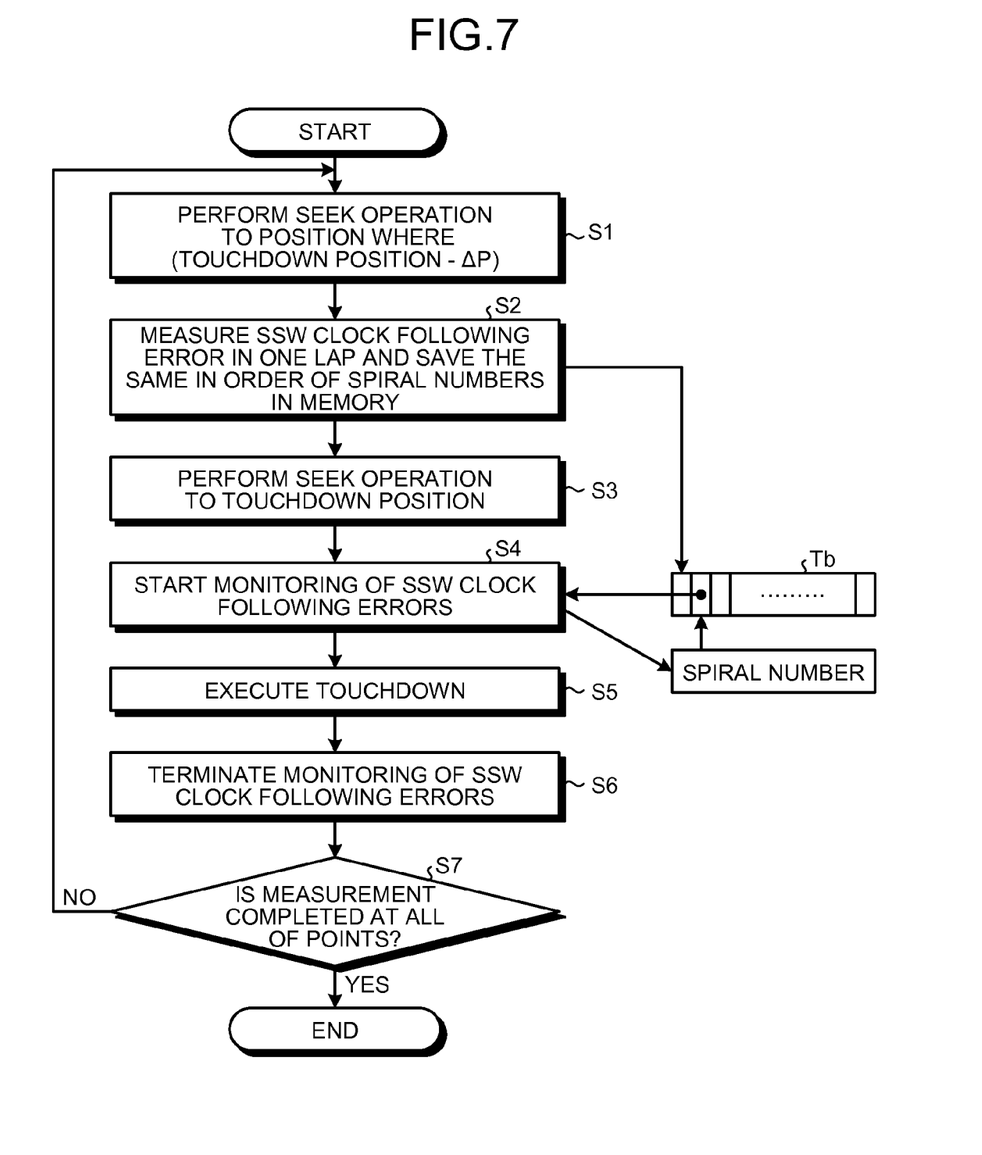
FIG. 7 is a flowchart of a clock accuracy determining method according to a second embodiment.

FIG. 7 is a flowchart of a clock accuracy determining method according to a second embodiment. FIG. 7 provides one example of a touchdown process (hereinafter, referred to as TD) immediately before SSW. Specifically, in the second embodiment, to perform TD measurement at a plurality of track positions on the entire disc surface, it is ascertained whether there is no abnormality in SSW clock following error during TD. In the touchdown process, the magnetic heads H0 to H3 are contact with the disc surfaces M0 to M3 to measure the levitation amounts of the magnetic heads H0 to H3.

Referring to FIG. 7, a seek operation is performed to move the magnetic head to a position distant by the track interval ΔP from the TD position (S1). Next, the SSW clock following error for one lap is measured for each of the spiral numbers and saved in association with the spiral number in an SSW clock following error table Tb (S2). The seek operation is performed to move the magnetic head to the TD position (S3), and then monitoring of the SSW clock following error is started (S4).

Specifically, the clock following error Si1 (i is a spiral number) is measured at the TD position with each sample timing, and, taking the spiral number i as an index, the clock following error Si2 at the position distant by ΔP corresponding to the relevant spiral number i is read from the SSW clock following error table Tb. Further, Si3=Si1-Si2 is calculated, and when |Si3|≤Th, it is determined that the SSW clock accuracy is normal, or when |Si3|>Th, it is determined that the SSW clock accuracy is abnormal (i=1 . . . N).

Next, TD is executed while the clock following error is monitored (S5), and the SSW clock accuracy is continuously monitored for occurrence of abnormality by the end of the monitoring of the clock following error (S6). Then, it is checked if measurement is completed at all of the TD positions (S7), and when the measurement is not yet completed at all of the TD positions (S7: No), the process returns to S1 to repeat S1 to S7 until the measurement is completed at all of the TD positions (S7: Yes).

By determining the SSW clock accuracy based on the difference Si3 at the time of TD calibration, it is possible to reduce the frequency with which the TD calibration is determined as erroneous and improve the success rate of the TD calibration.

Third Embodiment

As the first embodiment, descriptions are given as to the method for evaluating the clock accuracy by calculating the difference Si3 between the SSW clock following errors Si1 and Si2 at the two points Pi1 and Pi2 distant from each other by the track interval ΔP. As a third embodiment, descriptions will be given as to a method for determining the SSW clock accuracy at two points with a track interval different from ΔP.

Figure 8:
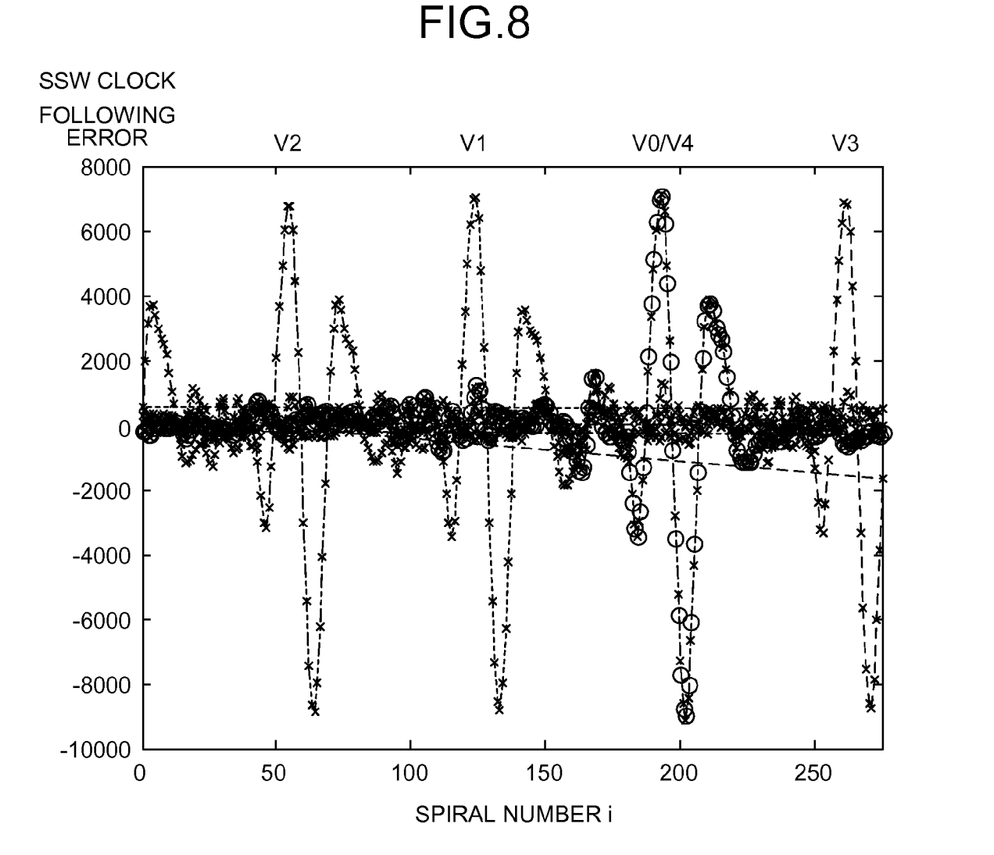
FIG. 8 is a diagram illustrating a relationship between spiral numbers and SSW clock following errors in a clock accuracy determining method according to a third embodiment.

FIG. 8 is a diagram illustrating a relationship between spiral numbers and SSW clock following errors in a clock accuracy determining method according to the third embodiment.

FIG. 8 illustrates SSW clock following errors V0, V1, V2, V3, and V4 on tracks Tk0, Tk1, Tk2, Tk3, and Tk4 with each shift of -ΔP/4 in track interval. It is understood that the phases of the SSW clock following errors are advanced by N/4 with respect to the spiral numbers i in proportion to the track interval ΔP/4. It is here assumed that the SSW clock following errors Vj (j=0 . . . 4) are re-arranged in the order of spiral numbers.

Figure 9:
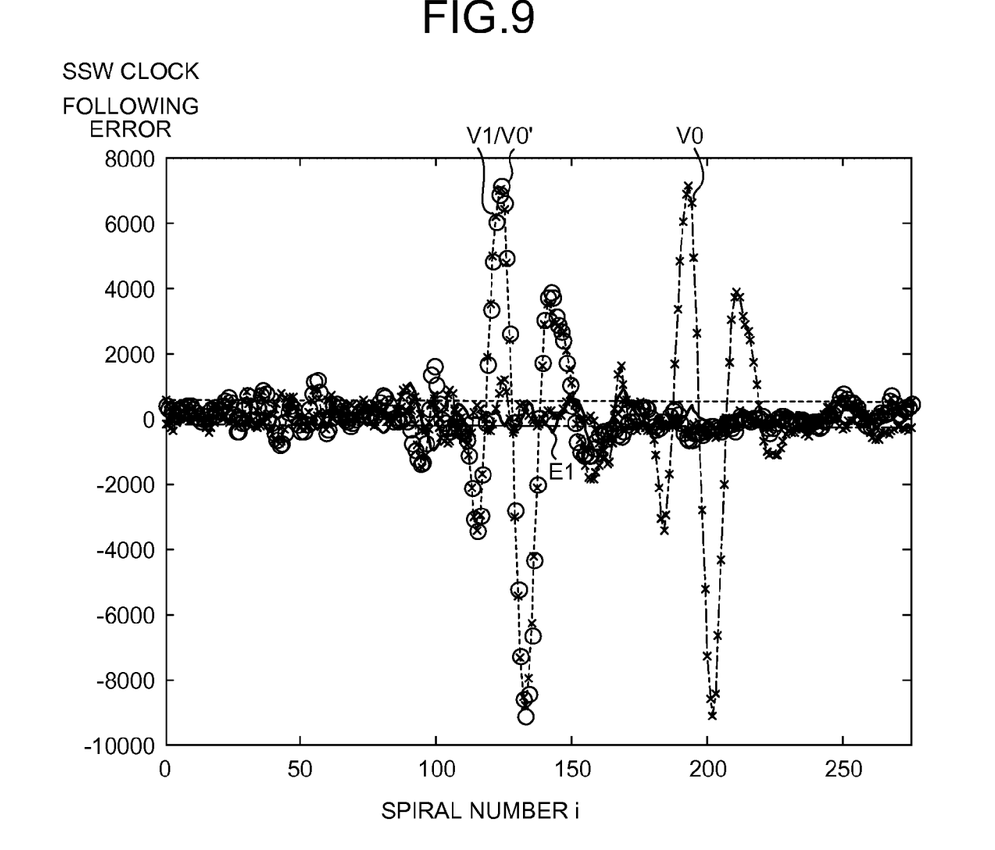
FIG. 9 is a diagram illustrating a relationship between spiral numbers and SSW clock following errors after phase shift in the clock accuracy determining method according to the third embodiment.

FIG. 9 is a diagram illustrating a relationship between spiral numbers and SSW clock following errors after phase shift in the clock accuracy determining method according to the third embodiment.

Referring to FIG. 9, an arrangement in which the phase of the arrangement V0 is advanced by N/4 is designated as V0'. Then, difference E1 between the arrangement V1 obtained from the SSW clock following error on the track Tk1 and the arrangement V0' obtained from the SSW clock following error on the Tk0 is determined by the following equation:

$$E1=V1-V0'$$

where Ei1 (i=1 ... N) are elements corresponding to the spiral numbers i of the arrangement E1.

Then, when |Ei1|≤Th for all of the spiral numbers i, it is determined that the SSW clock accuracy is normal, and when |Ei1|>Th for any one of the spiral numbers i, it is determined that the SSW clock accuracy is abnormal. In the difference E1, since the in-phase components of the SSW clock following errors included in the arrangements V1 and V0' are canceled, −Th<Ei1<Th for all of the spiral numbers i and it is thus determined that the clock accuracy is normal.

By determining the SSW clock accuracy based on the difference with shifts in the SSW clock following errors by the phase shift amount of the correlative components of the SSW clock following errors, it is possible to eliminate the need to measure the SSW clock following errors at the two points with a track interval equivalent to a spiral lap.

In the third embodiment described above, the phases of the SSW clock following errors are advanced by N/4 with respect to the spiral numbers i in proportion to the track interval ΔP/4. Alternatively, the present invention may be applied to the case where the phases of the SSW clock following errors are advanced by N/K (K is a positive integer) with respect to the spiral numbers i in proportion to the track interval ΔP/K.

Fourth Embodiment

Figure 10:
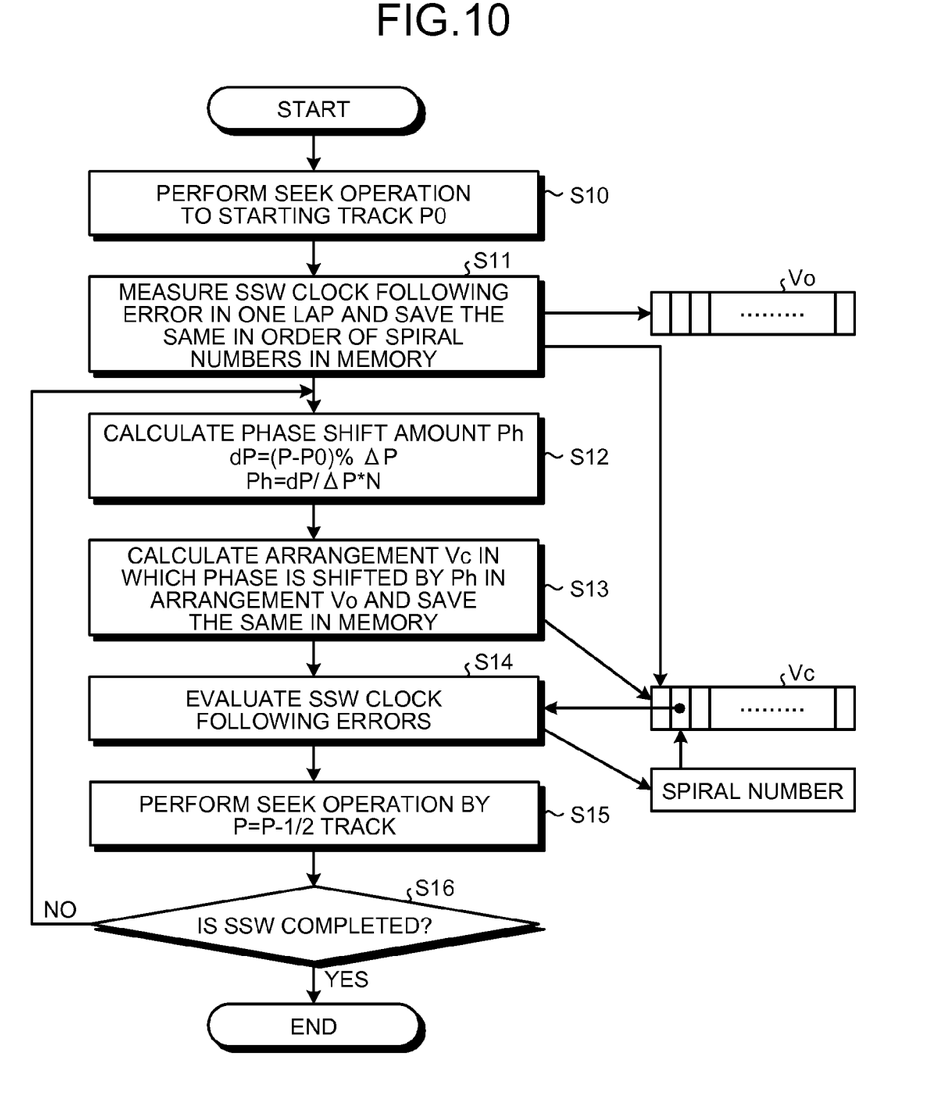
FIG. 10 is a flowchart of a clock accuracy determining method according to a fourth embodiment.

FIG. 10 is a flowchart of a clock accuracy determining method according to a fourth embodiment. FIG. 10 illustrates the case where SSW is performed with a ½ track pitch.

Referring to FIG. 10, the seek operation is performed to move the magnetic head to the starting track P0 (S10). Next, the SSW clock following errors on the starting track P0 are measured for one lap and stored in the SSW clock following error arrangements Vo and Vc (S11). Then, taking into account the difference between the present position P and the starting track P0 and the track interval ΔP, a track difference dP correlative to the phases of the SSW clock following errors is calculated using the following equation:

$$dP=(P-P0)\%\Delta P$$

where % denotes a remainder of division of (P−P0) by ΔP.

Further, a phase shift amount Ph with respect to the arrangement Vo of the SSW clock following errors on the starting track P0 is calculated from the track difference dP using the following equation (S12):

$$Ph=dP/\Delta P*N$$

where the phase shift amount Ph is equivalent to the spiral number with a phase shift but is not necessarily an integer.

Next, an SSW clock following error arrangement Vc is created in which the phase of the SSW clock following error arrangement Vo on the SSW starting track P0 is changed by Ph (S13).

Then, the SSW clock following error Si1 is measured with each sample timing, and, taking the spiral number i as an index, the SSW clock following error Si2 corresponding to the relevant spiral number i is read from the SSW clock following error arrangement Vc. Further, Si3=Si1−Si2 is calculated, and when |Si3|≤Th, it is determined that the SSW clock accuracy is normal, or when there is any spiral number i meeting |Si3|>Th, it is determined that the SSW clock accuracy is abnormal (S14).

Then, after the magnetic head is fed by −½ track (S15), it is checked if the SSW is completed (S16). When the SSW is not yet completed (S16: No), the process returns to S12 to repeat S12 to S16 until the SSW is completed (S16: Yes).

By determining the SSW clock accuracy based on the difference Si3 on SSW, it is possible to evaluate the SSW clock accuracy each time the magnetic head is fed and thus improve the success rate of the SSW.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A clock accuracy determining method comprising:
   reading back a signal from a multi-spiral pattern pre-recorded on a magnetic disc;
   generating an SSW clock at a read/write channel; and
   determining SSW clock accuracy based on results of comparison between SSW clock following errors read from two different points in each of spiral patterns constituting the multi-spiral pattern, when timing error between the read back signal and the SSW clock is set as one of the SSW clock following errors.

2. The clock accuracy determining method according to claim 1, comprising:
   calculating a differential value between the SSW clock following errors at two points equal to each other in angle from a reference angle in the same spiral pattern; and
   determining that the SSW clock accuracy is erroneous when the differential value exceeds a threshold value.

3. The clock accuracy determining method according to claim 2, comprising determining the SSW clock accuracy at time of touchdown calibration by which a magnetic head contact a disc surface to detect a levitation amount of the magnetic head.

4. The clock accuracy determining method according to claim 3, comprising:
   storing one lap of data of SSW clock following errors at a position distant from a touchdown position by a track interval equivalent to one lap in the spiral pattern, in the order of spiral numbers; and
   determining whether the SSW clock accuracy is erroneous based on results of comparison between a SSW clock following error measured at the touchdown position and a SSW clock following error referred to with the spiral numbers as indexes.

5. The clock accuracy determining method according to claim 1, wherein the SSW clock accuracy is determined based on results of cancellation of correlative components of SSW clock following errors read back from different points in the same spiral pattern.

6. The clock accuracy determining method according to claim 1, comprising:
   canceling a correlative component of SSW clock following errors between two points in the same spiral pattern; and
   determining that SSW clock accuracy is erroneous when the SSW clock following errors of which the correlative component are canceled exceed a threshold value.

7. The clock accuracy determining method according to claim 6, comprising:
  correcting a phase shift in SSW clock following errors on a track at which a track interval is shifted from a track interval equivalent to one lap in a spiral pattern;
  calculating a differential value between the SSW clock following errors at two points in the spiral pattern with the phase shift is corrected; and
  determining that SSW clock accuracy is erroneous when the differential value exceeds a threshold value.

8. The clock accuracy determining method according to claim 2, comprising determining the SSW clock accuracy at time of SSW.

9. The clock accuracy determining method according to claim 1, comprising:
  determining a phase shift amount of correlative components of SSW clock following errors at a current position and a reference track based on a relative track amount from the reference track to the current position;
  shifting a SSW clock following error on the reference track by the phase shift amount; and
  determining whether the SSW clock accuracy is erroneous based on results of comparison between a SSW clock following error measured at the current position and the SSW clock following error shifted by the phase shift amount.

10. The clock accuracy determining method according to claim 9, comprising determining the phase shift amount based on a remainder of division of a track conversion value equivalent to a radial displacement of one lap in the spiral pattern into the relative track amount.

11. The clock accuracy determining method according to claim 1, wherein
  the multi-spiral pattern includes N (N is an integer of 2 or more) spiral patterns Li (i=1 ... N), and
  SSW clock following errors of one lap including point pm1 in a specific spiral pattern Lm increase in the spiral pattern Lm with respect to the spiral pattern Li.

12. The clock accuracy determining method according to claim 1, wherein
  the multi-spiral pattern includes N (N is an integer of 2 or more) spiral patterns Li (i=1 ... N), and
  when a track conversion value equivalent to one lap in the spiral pattern is designated as ΔP, SSW clock following errors increase in a spiral pattern shifted by 1*ΔP+ΔP/K (K is a positive integer and 1 is zero or a positive integer) from the reference track with respect to the spiral pattern Li.

13. The clock accuracy determining method according to claim 1, wherein the SSW clock following errors are calculated based on results of comparison between an SSW clock read back from the spiral pattern and a reference clock.

14. The clock accuracy determining method according to claim 13, wherein
  synchronization marks are provided circumferentially in the spiral pattern at predetermined intervals, and
  the SSW clock is read back based on results of playback of the synchronization marks.

15. The clock accuracy determining method according to claim 14, wherein, when a magnetic head obliquely passes over the spiral pattern, waveform of playback signal in the spiral pattern has a lozenge-shaped waveform.

16. The clock accuracy determining method according to claim 15, wherein gaps are formed in a playback signal in the spiral pattern based on the synchronization marks.

17. A clock accuracy determining device, comprising:
  a magnetic disc; and
  a controller configured to determine SSW clock accuracy based on results of comparison between SSW clock following errors read from two different points in each of spiral patterns constituting the multi-spiral pattern, when timing error between a signal read back from a multi-spiral pattern pre-recorded on the magnetic disc and an SSW clock generated at a read/write channel is set as one of the SSW clock following errors.

18. The clock accuracy determining device according to claim 17, wherein the controller is configured to:
  calculate a differential value between the SSW clock following errors at two points equal to each other in angle from a reference angle in the same spiral pattern; and
  determine that the SSW clock accuracy is erroneous when the differential value exceeds a threshold value.

19. The clock accuracy determining device according to claim 18, wherein the controller is configured to:
  store one lap of data of SSW clock following errors at a position distant from a touchdown position where a magnetic head contact a disc surface by a track interval equivalent to one lap in the spiral pattern, in the order of spiral numbers; and
  determine whether the SSW clock accuracy is erroneous based on results of comparison between a SSW clock following error measured at the touchdown position and a SSW clock following errors referred to with the spiral numbers as indexes.

20. The clock accuracy determining device according to claim 17, wherein the controller is configured to determine the SSW clock accuracy based on results of cancellation of correlative components of SSW clock following errors read back from different points in the same spiral pattern.

* * * * *